Figure 1:
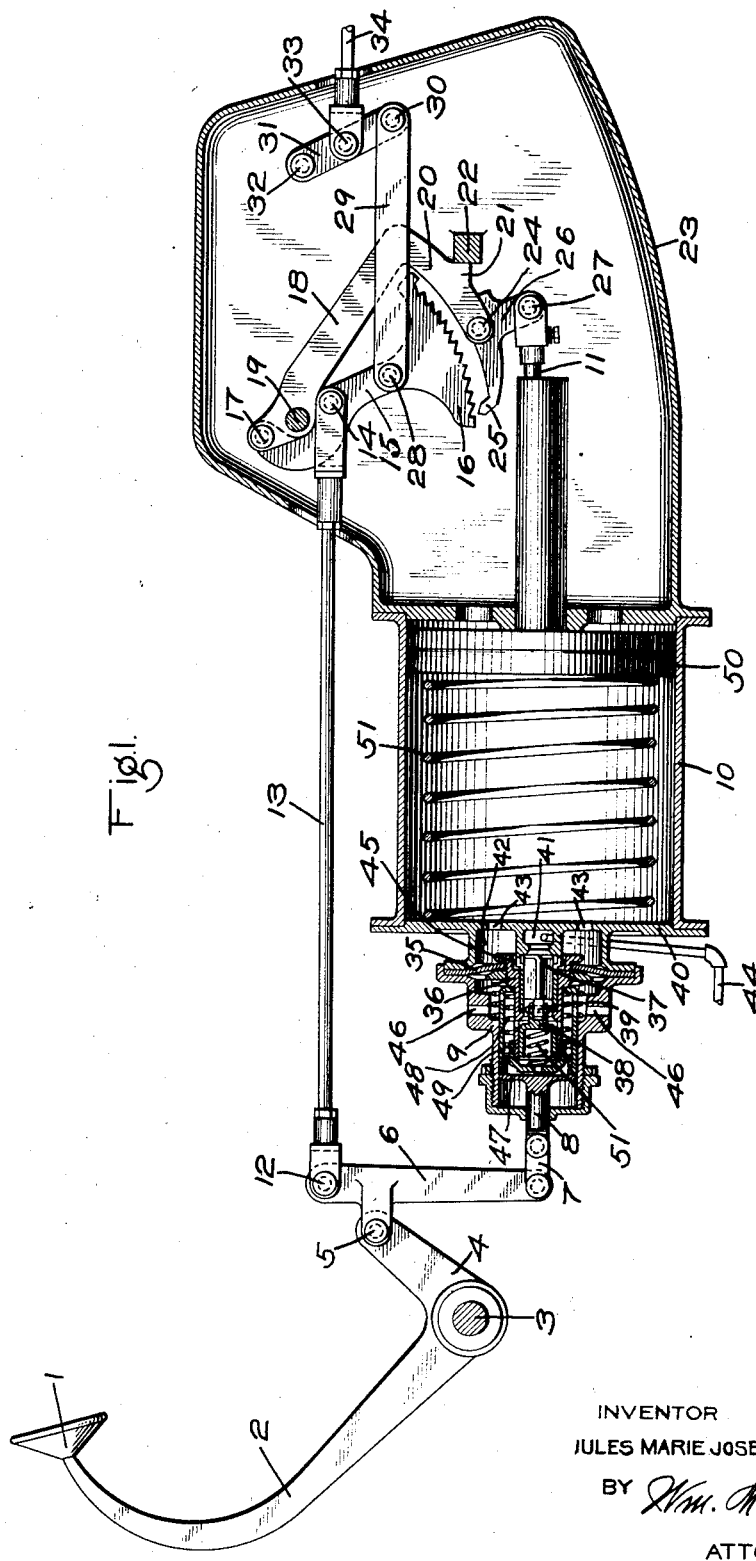

Oct. 14, 1930.   J. M. J. DORMOY   1,778,106
VEHICLE BRAKE DEVICE
Filed Sept. 8, 1927   2 Sheets-Sheet 1

INVENTOR
JULES MARIE JOSEPH DORMOY
BY Wm. M. Cady
ATTORNEY

Oct. 14, 1930.   J. M. J. DORMOY   1,778,106
VEHICLE BRAKE DEVICE
Filed Sept. 8, 1927   2 Sheets-Sheet 2
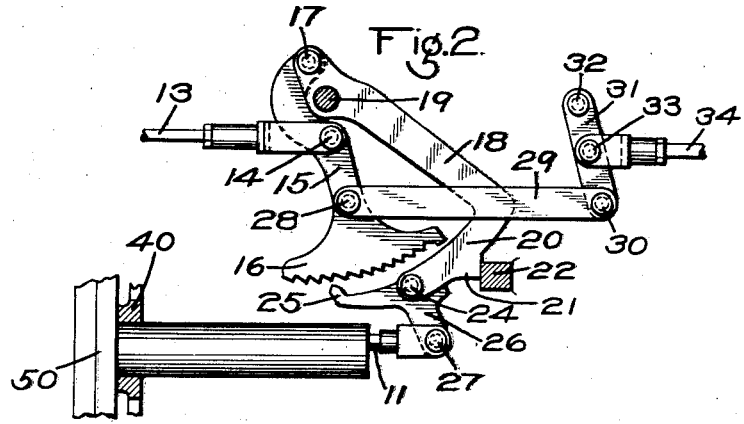
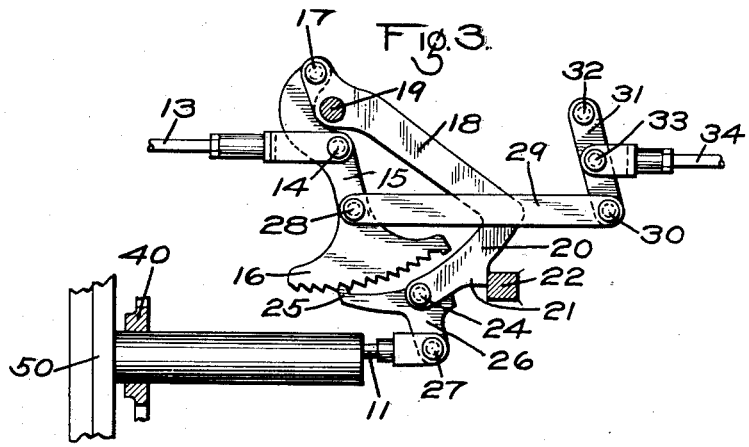
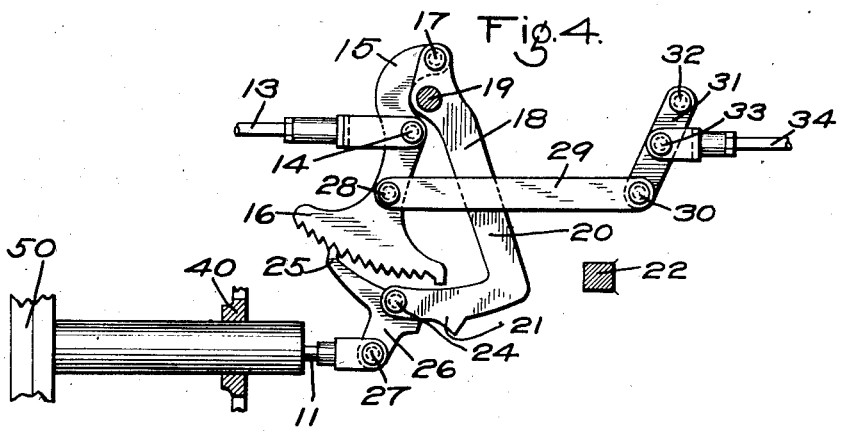
INVENTOR
JULES MARIE JOSEPH DORMOY
BY Wm. M. Cady
ATTORNEY Patented Oct. 14, 1930

1,778,106

UNITED STATES PATENT OFFICE

JULES MARIE JOSEPH DORMOY, OF PARIS, FRANCE, ASSIGNOR TO THE WESTINGHOUSE AIR BRAKE COMPANY, OF WILMERDING, PENNSYLVANIA, A CORPORATION OF PENNSYLVANIA

VEHICLE BRAKE DEVICE

Application filed September 8, 1927, Serial No. 218,250, and in Great Britain February 18, 1927.

This invention relates to fluid pressure braking apparatus of the kind adapted particularly although not exclusively for use in connection with automobile vehicles, the object of the invention being to provide improved apparatus of this character whereby the braking action shall be more effectively obtained and controlled.

In all cases in which the brake mechanism comprises a braking element such as brake shoes, segments, bands or the like adapted to be applied to the rotary element to be braked, the braking operation comprises two more or less distinct stages, the first of which, hereinafter termed the "braking application stage", consisting in the displacement of the braking element from its normal or release position out of contact with the rotary element, to its braking position in which it is in actual contact with this element. The nature of this stage of the braking operation as regards the displacement and energy required will evidently depend upon the initial adjustment of the brake rigging, and upon the subsequent wear in service of the moving parts.

The second stage of the braking operation hereinafter termed the "braking pressure stage" consists in the exertion or development of the necessary contact pressure between the braking element and the rotary element to effect the desired reduction in speed of the latter element. This stage involves a displacement of the brake rigging dependent upon the degree of contact pressure required, this displacement being however usually very small relative to the displacement involved in the first stage and corresponding to the mechanical deformation of the transmission elements of the rigging and of the braking element and the pressure involved.

According to the principal feature of the invention, the two stages of operation above referred to are arranged to be effected by more or less definitely defined displacements of the controlling pedal or lever of the apparatus corresponding to the bringing into action of different sources of power for effecting the two stages.

Preferably as applied to the braking apparatus of an automobile vehicle the invention contemplates the first stage being effected mechanically by the pressure exerted upon the controlling pedal or lever by the operator, the second stage being effected by a servo device of any suitable character either solely or assisted by a continuance of the mechanical pressure above referred to.

According to a further feature of the invention, the successive stages of the displacement of the controlling pedal or lever corresponding to the two stages of the braking operation are arranged to have any desired relation to one another, both as regards the extent of such displacements, or the pressures on the controlling pedal or lever necessary to effect these displacements. In the accompanying drawings; Fig. 1 is a side elevation, generally in section, of a brake equipment embodying my invention, as applied to an automotive vehicle; Fig. 2 a view illustrating the initial position assumed by the take-up mechanism in applying the brakes; Fig. 3 the position assumed by the take-up mechanism when the servo brake starts to act; and Fig. 4 a position of the take-up mechanism after the servo brake has acted.

Referring now to the drawings, it will be seen that the apparatus comprises the controlling pedal 1 mounted at one end of the longer arm 2 of a bell crank lever pivoted at 3, the shorter arm 4 of the bell crank lever being pivotally connected as indicated at 5 to an intermediate point in a floating lever 6. The lower end of the lever 6 is pivotally connected by means of a link 7 to the control rod 8 of a control valve 9 for the servo device, which, as shown in the drawings, comprises a cylinder 10 containing a piston connected to a piston rod 11. The interior of the brake cylinder 10 is arranged to be subjected alternatively to atmospheric pressure or to a pressure above or below this pressure by the action of the control valve 9, in order correspondingly to actuate a brake piston 50 contained within the cylinder 10. For example, the control valve 9 may be arranged when its controlling rod 8 is moved outward toward the left to establish communication between the interior of the cylinder 10 and the induction pipe of the internal combustion engine of the vehicle.

The upper end of the floating lever 6 is pivotally connected as indicated at 12 to one end of a rod 13, the opposite end of which is pivotally connected as indicated at 14 to an intermediate point in a lever 15 carrying at its lower end a toothed segment 16. The upper end of the lever 15 is pivotally connected as indicated at 17 to the upper end of a lever 18 mounted upon a fixed pivot 19. The lower end of the lever 18 carries an extension 20 having a projection 21 adapted to engage with a fixed stop 22 formed in the casing 23 of the apparatus, a bell crank lever being pivotally mounted as indicated at 24 upon the end of the extension 20 of the lever 18. One arm of this bell crank lever constitutes a pawl 25 adapted to engage with the teeth of the segment 16, the other arm 26 of the bell crank lever being pivotally connected as indicated at 27 to the end of the piston rod 11. An intermediate point in the lever 15 is pivotally connected as indicated at 28 to one end of a link 29, the opposite end of which is pivotally connected as indicated at 30 to one end of a lever 31 pivotally mounted at 32 in the casing 23, an intermediate point in the lever 31, as indicated at 33, being connected to a rod 34 connected to the braking element or elements of the vehicle.

The controlling valve 9 may be of any suitable construction adapted either to control a vacuum or compressed air or other gas, but preferably is of the type shown, comprising a body portion containing a flexible diaphragm 35 to which is secured a valve casing 36. Mounted in the valve casing 36 is an inlet valve 37 and a release valve 38, said valves being connected together by a pin 39.

The valve 37 has a seat provided on a centrally located extending portion of the brake cylinder head 40 and controls communication from a chamber 41 in said extension to chamber 42 at one side of the diaphragm 35, the chamber 42 being open to the brake cylinder chamber through openings 43.

The chamber 41 is preferably connected by a pipe 44 to the intake manifold (not shown) of an internal combustion engine.

The release valve 38 has a seat provided in the valve casing 36 and controls communication from chamber 42, which is open to the interior of the valve casing through openings 45 to the atmosphere, by way of openings 46.

Mounted in the body portion of the controlling valve device 9 is a hollow piston or plunger 47 which is secured to a stem 8 extending out through an opening in the body portion. The stem 8 is connected through a link 7 with the lower end of the lever 6.

The right hand end of the piston 47 is provided with an inturned flange for receiving one end of a coil spring 48, the other end of the spring engaging a collar 49 carried by the valve casing 36.

The operation of the apparatus is as follows:—

The pressure exerted by the operator upon the pedal 1 to effect an application of the brakes causes the bell crank lever 2, 4 to be rotated in a counter-clockwise direction about its pivot 3, thereby exerting a pull upon the floating lever 6 tending to move this lever towards the left. The two arms of this floating lever, that is to say the portions of the lever above and below the pivot 5, are so proportioned relative to the resistance opposing the movement of the two ends of the lever 6 towards the left, that the floating lever 6 will, during the initial stage of the displacement of the pedal 1, be rocked in a counter-clockwise direction about the lower end of the lever before any effective movement of this end of the lever occurs. The resistance opposing the movement towards the left of the lower end of the floating lever 6 is evidently that due to the action of the spring in the controlling valve 9 opposing the outward movement of the controlling rod 8, while the resistance offered to the movement towards the left of the upper end of the floating lever 6 is that due to the releasing spring, (not shown) of the braking mechanism, transmitted through the rod 13, the lever 15, link 29, lever 31 and the rod 34. It will thus be seen that during the initial displacement of the pedal 1 the pivot 12 and the upper end of the floating lever 6 is moved towards the left, carrying with it the rod 13, thereby causing the lever 15 to be rocked about the pivot 17, this movement of the lever 15 transmitted through the link 29 and the lever 31 causing the rod 34 to bring the brake blocks into engagement with the brake drum, or drums, of the vehicle, thereby effecting the first stage of the braking operation above referred to. The pull exerted by the rod 13 during this stage will evidently tend to rock the lever 18 about its fixed pivot 19 thereby causing the projection 21 to abut against the stop 22, thus tending to maintain the lever 18 and its extension 20 in the position shown in the drawing.

The movement of the lever 15 above described will evidently cause the segment 16 to move towards the left to a corresponding extent so that one of its intermediate teeth is opposite to the pawl 25, as shown in Fig. 2, the position of the segment 16 relative to the pawl 25 at this stage being naturally dependent upon the extent of displacement of the brake rigging necessary to effect the first stage of the braking operation.

As soon, however, as this stage of the braking operation has been completed, the increased resistance to the further movement towards the left of the rod 13 will cause the continued depression of the pedal to effect a rocking movement of the floating lever 6 about the pivot 12 in a clockwise direction, thereby causing the control rod 8 of the valve 9 to move outwards against the action of its opposing spring.

The outward movement of the stem 8 causes the piston 47 to exert pressure to move spring 48 toward the left and through the pressure exerted on the spring, the valve casing 36 and the diaphragm 35 are moved toward the left. This movement first causes the release valve 38 to seat by the action of spring 51 and then further movement causes the inlet valve 37 to be lifted from its seat, so that the chamber 42 and the interior of the brake cylinder are connected to the pipe 44 and the intake manifold of the engine. A partial vacuum is thus created in the brake cylinder, which causes the movement of the piston 50 toward the left by atmospheric pressure acting on the right hand face of the piston. As a result of this movement, the bell crank lever comprising the arm 26 and the pawl 25 will be rotated in a clockwise direction about the pivot 24. The pawl 25 is thus brought into engagement with the tooth on the segment 16 opposite to the pawl, as shown in Fig. 3, and the segment 16 and consequently the lever 15 are mechanically coupled to the lever 18. The piston rod 11 will now by its continued movement cause the coupled levers 15 and 18 to rotate about the pivot 19, as shown in Fig. 4, and consequently exert through the link 29 a pull upon the rod 34 serving to effect the second stage of the braking operation above described, this stage being consequently effected by the fluid pressure action of the servo device combined with the mechanical effort exerted by the operator transmitted through the rod 13.

When the partial vacuum in chamber 42, is such that the atmospheric pressure acting on the opposite side of the diaphragm is sufficient to overcome the resistance of the spring 48 tending to hold the diaphragm to the left, the diaphragm will be moved toward the right until the valve 37 seats the valve 38 remaining seated. The further exhaust of air from the brake cylinder is thus cut off.

In order to release the brakes, the pressure on the pedal 1 is relieved, which causes movement of the floating lever 6 toward the right by the action of the usual release springs of the brake elements and the spring 48 acting on the piston 47. The piston 47 thus moves toward the right and the diaphragm 35 with the valve casing 36 also moves toward the right, until the valve 38 unseats, assuming the position shown in Fig. 1. Air is then admitted from the atmosphere to chamber 42 and to the brake cylinder, so that the spring 51 acts on the piston 50 to shift same toward the right.

This movement causes the pawl 25 to be thrown out of engagement with the tooth of the segment 16, by the movement of the arm 26 toward the right and thus permits the movement of the segment 16 and the brake rod 34 to the right, by the action of the usual release springs associated with the braking elements, so that the parts assume the release position, as shown in Fig. 1.

In the arrangement illustrated it will be understood that the action of the valve 9 causes a reaction proportional to the fluid pressure braking upon the pedal 1 so that the operator is at all times notified in this manner of the actual braking effected.

It should be observed that at the transition from the first stage to the second stage of the braking operation the rotational or rocking movement of the lever 15 connected to the brake rigging is transferred from the pivot 17 to the pivot 19 so that during the first stage of the braking operation the displacement towards the left of the rod 13 relative to the displacement in the same direction of the rod 34 is proportional to the relative distances apart of the pivots 17 and 14, and 17 and 28. During the second stage of the braking operation, however, the relative displacement of the rods 13 and 34 is proportional to the distances separating the pivots 19 and 14, and 19 and 28, so that during this stage of the braking operation the displacement of the pedal 1 relative to that of the rod 34 is less than that of the first stage. This change in the proportion between the relative displacements of the pedal and the brake rigging may evidently be caused to have any desired value by suitably selecting the position of the pivot 14 on the lever 15, and it will be evident that by placing the pivot 14 in such a position that the pivots 14 and 19 substantially coincide with the axis or direction of movement of the rod 13 during the first stage of the braking operation, the movement towards the left of the rod 13 during the second stage of the braking operation may be rendered substantially zero. Under these conditions the continued displacement of the pedal 1 during the second stage of the braking operation will not effect any substantial movement of the pivot 12, the floating lever 6 rocking in a clockwise direction about this pivot so as to effect a further outward movement of the control rod 8 of the valve 9 and thereby increase the braking pressure under the action of the piston rod 11 acting upon the coupled levers 15 and 18.

It will be evident that the embodiment of the invention above described comprises arrangements for effecting the braking operation in two distinct stages, the braking application stage being effected in such a manner as to involve only the displacement or actuation of the mechanism for this stage, thereby reducing the amount of energy required. Similarly, the operation of controlling the braking pressure stage can be rendered independent as regards the displacement of or pressure exerted upon the controlling pedal or lever of that of the first stage so as to ensure any desired relations between the action of the controlling lever or pedal and the action of the brake rigging to be obtained during the whole of the braking operation.

It will also be observed that by the subdivision of the braking operation in the manner above described the construction and arrangement of the servo device effecting the second stage can be modified with advantage owing to the relatively small displacements of the parts necessary to effect the braking pressure stage. The brake cylinders or diaphragm chambers of the servo device can thus be of correspondingly smaller dimensions and smaller extents of stroke or travel.

The invention is thus not limited to any particular constructional arrangements for carrying the invention into practice, and includes within its scope all mechanisms capable of obtaining the results above described.

Having now described my invention, what I claim as new and desire to secure by Letters Patent, is:—

1. In a vehicle brake, the combination with a brake operating element, of differential pressure means for operating said element, a manually operable member for controlling the operation of said means and connected to mechanically operate said element, and means operated by the initial movement of said pressure means for operatively connecting said pressure means to said element.

2. In a vehicle brake, the combination with a brake operating element, of differential pressure means for operating said element, a manually operable member for controlling the operation of said means and connected to mechanically operate said element free of said pressure means, and means operated upon initial movement of said pressure means for operatively connecting said pressure means to said element.

3. In a vehicle brake, the combination with a brake operating element, of differential pressure means for operating said element, a manually operable member for controlling the operation of said means and connected to mechanically operate said element, without operating said pressure means, and means operated upon initial movement of said pressure means for operatively connecting said pressure means to said element.

4. In a vehicle brake, the combination with a brake operating element, of a piston operated by different pressures on its opposite sides for operating said element, a manually operable member, means operated by said member for varying the pressure on said piston, said member being connected to mechanically operate said brake operating element, and means operated upon initial movement of said piston for operatively connecting said piston to said element.

5. In a vehicle brake, the combination with a brake operating element, of a lever operatively connected to said element, a manually operable member operatively connected to said lever, differential pressure means, and means operated upon initial movement of said pressure means for operatively connecting said pressure means to said lever.

6. In a vehicle brake, the combination with a brake operating element, of a lever operatively connected to said element, and provided with a toothed segment, a manually operable member operatively connected to said lever, a pawl adapted to engage a tooth of said segment, and differential pressure means operatively connected to said pawl and adapted upon movement to cause said pawl to engage a tooth of said segment.

7. In a vehicle brake, the combination with a brake operating element, of a lever operatively connected to said element, and provided with a toothed segment, a manually operable member operatively connected to said lever, a fulcrumed lever connected to the other lever, a pawl carried by said fulcrumed lever, and fluid pressure operated means for operating said pawl to cause the pawl to engage a tooth of said segment.

8. In a vehicle brake, the combination with a brake operating element, of a lever operatively connected to said element, and provided with a toothed segment, a manually operable member operatively connected to said lever, a fulcrumed lever connected to the other lever, a pawl carried by said fulcrumed lever, and fluid pressure means adapted upon movement to first operate said pawl to cause the pawl to engage a tooth of said segment and then operate said levers to cause movement of said element.

9. In a vehicle brake, the combination with a brake operating element, of a lever operatively connected to said element, and provided with a toothed segment, a manually operable member operatively connected to said lever, a fulcrumed lever connected to the other lever, a pawl carried by said fulcrumed lever, fluid pressure operated means for operating said pawl to cause the pawl to engage a tooth in said segment and then operable to move said levers, and a stop engageable by said fulcrumed lever when the other lever is operated by said manually operable member.

10. In a vehicle brake, the combination with a brake operating element, of a lever operatively connected to said element, a manually operable rod connected to said lever, a fulcrumed lever pivotally connected to said element operating lever, a stop engaged by said fulcrumed lever when the element operating lever is moved by said rod, a fluid pressure operated means, said means operated upon movement of said fluid pressure operated means for operatively connecting said fluid pressure operated means to said element operating lever.

In testimony whereof I have hereunto set my hand.

JULES MARIE JOSEPH DORMOY.